US006651632B2

(12) United States Patent
Thimmesch et al.

(10) Patent No.: US 6,651,632 B2
(45) Date of Patent: Nov. 25, 2003

(54) AIR INTAKE HEATER RETENTION MECHANISM

(75) Inventors: Jan P. Thimmesch, Eden Prairie, MN (US); Chadwick P. Anderson, Jordan, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 0 days.

(21) Appl. No.: 10/055,615

(22) Filed: Jan. 23, 2002

(65) Prior Publication Data

US 2002/0096155 A1 Jul. 25, 2002

Related U.S. Application Data

(60) Provisional application No. 60/263,918, filed on Jan. 25, 2001.

(51) Int. Cl.[7] .............................................. F02M 31/00
(52) U.S. Cl. ...................................................... 123/549
(58) Field of Search .................................. 123/549, 543, 123/557; 219/206, 207

(56) References Cited

U.S. PATENT DOCUMENTS

| 4,512,322 | A | * | 4/1985 | Barcy | 123/549 |
|---|---|---|---|---|---|
| 4,685,437 | A | * | 8/1987 | Tanaka et al. | 123/549 |
| 5,334,818 | A | | 8/1994 | Edwards et al. | |
| 5,595,164 | A | * | 1/1997 | Thimmesch | 123/549 |
| 5,743,242 | A | | 4/1998 | Thimmesch | |
| 5,887,575 | A | | 3/1999 | Thimmesch et al. | |
| 5,988,146 | A | | 11/1999 | Anderson et al. | |
| 5,992,399 | A | | 11/1999 | Anderson et al. | |
| 6,031,204 | A | | 2/2000 | Prust et al. | |
| 6,040,557 | A | | 3/2000 | Prust et al. | |
| 6,073,615 | A | | 6/2000 | Anderson et al. | |
| 6,119,665 | A | | 9/2000 | Anderson et al. | |
| 6,152,117 | A | | 11/2000 | Prust | |
| 6,242,712 | B1 | | 6/2001 | Prust | |

* cited by examiner

Primary Examiner—Marguerite McMahon
(74) Attorney, Agent, or Firm—Harness, Dickey & Pierce, P.L.C.

(57) ABSTRACT

An air intake assembly for an internal combustion engine includes an intake member having a passage for communicating air and a heater. The heater includes a first holder, a second holder, a heating element positioned between the first holder and the second holder, biasing means for urging one of the first holder and the second holder away from the other of the first holder and the second holder, and a retention mechanism coupling the first holder and the second holder to the intake member within the passage. The retention mechanism includes first and second tabs coupled to the first holder and second holders which biasedly engage the intake member.

11 Claims, 5 Drawing Sheets

AIR INTAKE HEATER RETENTION MECHANISM

CROSS-REFERENCE TO RELATED APPLICATION

This application claims the benefit of U.S. Provisional Application No. 60/263,918 filed on Jan. 25, 2001.

BACKGROUND OF THE INVENTION

1. Technical Field

The present invention generally relates to an apparatus for heating the air/fuel mixture entering the cylinders of an internal combustion engine. More particularly, the invention relates to a retention mechanism for coupling a heater to a housing.

2. Discussion

The air/fuel mixture entering the cylinders of an internal combustion engine is commonly heated to increase fuel economy and responsiveness to starting as well as to decrease pollutant discharge. One type of intake heating device includes a housing and frame disposed between the carburetor and an intake manifold. While this type of heater generally addresses cold starting issues, the frame of such devices is often times heavy and expensive. Additionally, the frame occupies valuable space which could be utilized for other engine components.

Accordingly, a need exists for a very small, light weight air intake heater attachment mechanism. Preferably, the attachment mechanism would function to interconnect the air heater with a variety of air intake components such as intake manifolds and air ducts constructed by any number of casting, stamping or molding methodologies.

Other heater designs have been contemplated by the common owner of the present application. The applicant hereby incorporates U.S. Pat. Nos. 5,988,146; 5,992,399; 6,073,615; 6,031,204 and 6,040,557 by reference.

DETAILED DESCRIPTION OF THE PREFERRED EMBODIMENT

Figure 1:
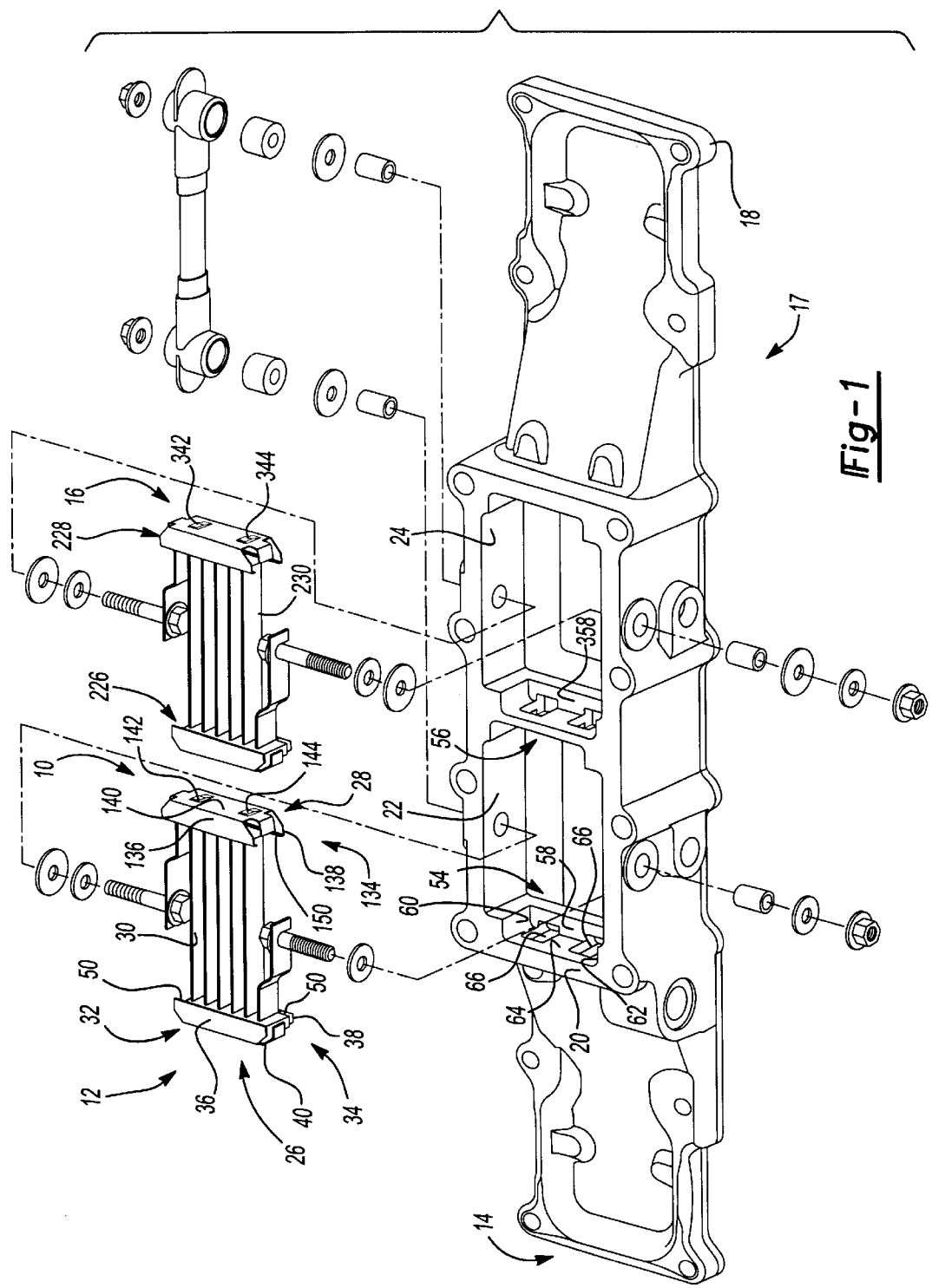
FIG. 1 is an exploded perspective view of an exemplary heater assembly including an air heater retention mechanism of the present invention.

With reference to FIG. 1, an air heater attachment mechanism constructed in accordance with the teachings of the present invention is generally identified at reference numeral 10. Attachment mechanism 10 functions in cooperation with a first air heater 12, an intake cover 14 and a second air heater 16 to form an intake assembly 17. It should be appreciated that depending on the size of engine equipped, the specific size of each heater and quantity of heaters utilized may vary.

Intake cover 14 includes a first mounting flange 18 which is connectable to the engine head (not shown) and a second mounting flange 20 connectable to an air intake tube (not shown). Each of the mounting flanges 18 and 20 serve to seal the engine intake passage from the environment surrounding the engine. Preferably, intake cover 14 is die cast from an aluminum alloy. Optimally, only flanges 18 and 20 are machined leaving the remaining surfaces as cast.

Figure 2:
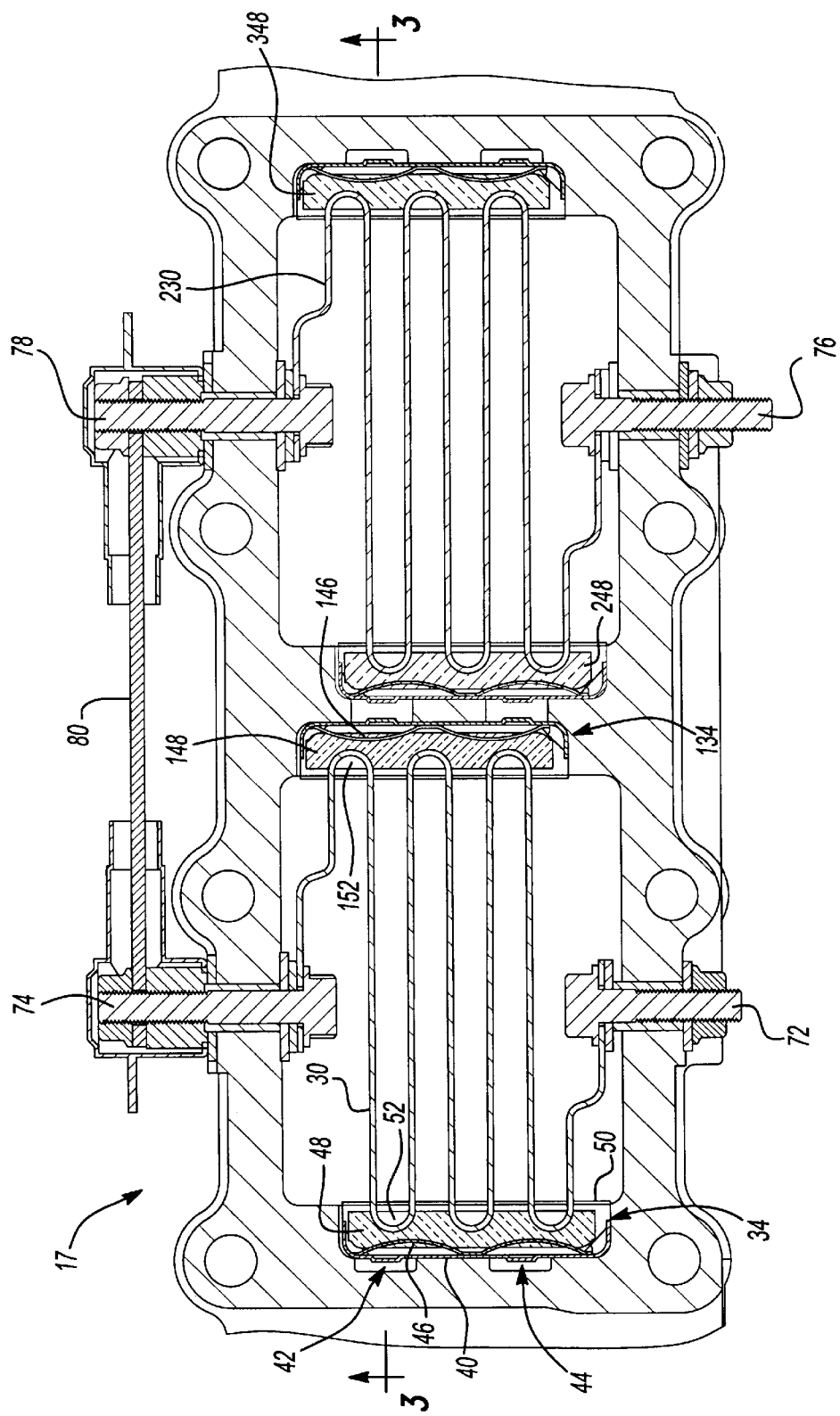
FIG. 2 is a cross-sectional view of the exemplary heater assembly.
Figure 3:
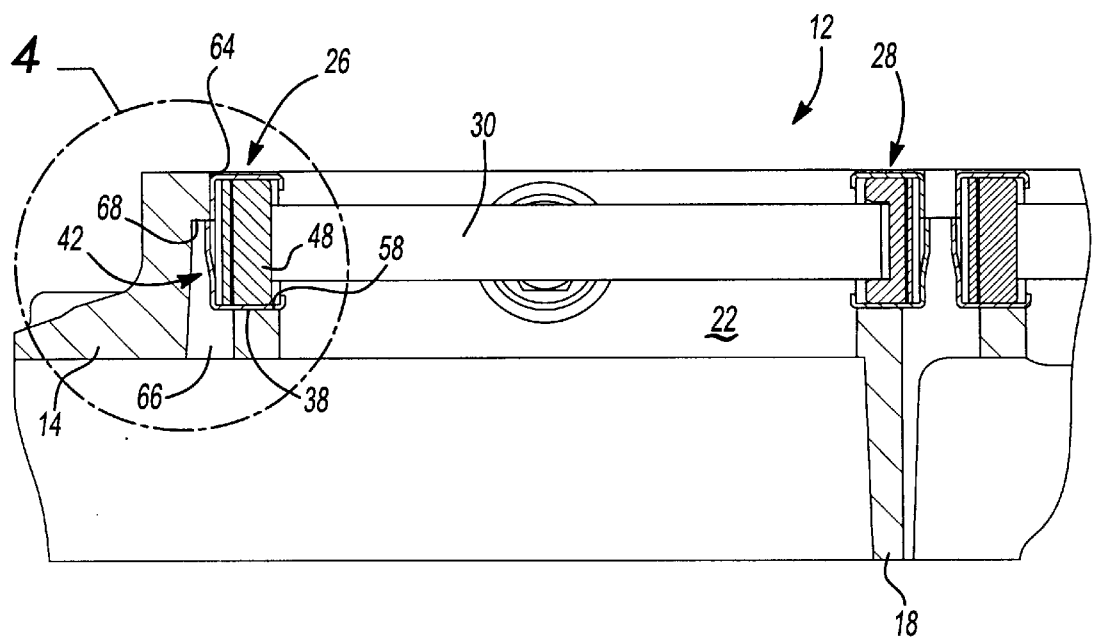
FIG. 3 is a partial cross-sectional view of the attachment mechanism of the present invention.

As best illustrated in FIGS. 1–3, first heater 12 is positioned within a first aperture 22 extending through intake cover 14. Similarly, second air heater 16 is positioned within a second aperture 24 adjacent aperture 22. During operation of the vehicle, intake air passes through each of first and second apertures 22 and 24 in route to the combustion chambers. It should be appreciated that first and second air heaters 12 and 16 are substantially similar to one another. Accordingly, only first air heater 12 will be described in further detail.

First air heater 12 includes a first holder 26, a second holder 28 and a serpentine heating element 30. First holder 26 includes a housing 32 preferably shaped from a stainless steel sheet. Housing 32 defines an "C" shaped channel 34 closed on three sides by opposed side walls 36, 38 and end wall 40. Housing 32 includes tabs 42 and 44 protruding from end wall 40.

A wave spring 46, also preferably formed from stainless steel, is disposed within channel 34 to engage end wall 40. A thermal and electrical insulator 48 is positioned within channel 34 to engage wave spring 46. It is contemplated that insulator 48 may be formed of a ceramic material known in the art to provide the desired thermal and electrical insulating properties. One skilled in the art will appreciate that wave spring 46 urges insulator 48 away from end wall 40 and toward stops 50 which extend inwardly into channel 34 from side walls 36 and 38. Insulator 48 includes cavities 52 to accommodate and position heating element 30 therein.

As shown in FIGS. 1 and 2, second holder 28 is configured in a substantially similar manner as first holder 26. Those skilled in the art will appreciate that the configuration and inter-relation of channel 134, side walls 136 and 138, end wall 140, tabs 142 and 144, wave springs 146, insulators 148, stops 150 and cavities 152 are substantially the same as the corresponding components described earlier. As mentioned earlier, second air heater 16 is configured substantially the same as first air heater 12. For clarity, the components of second air heater 16 are referred to herein by numerals increased by 200 relative to the numbers used to describe first heater 12.

Within first aperture 22, intake cover 14 further defines a generally "C" shaped recess 54 on one side of the aperture and another substantially identical recess 56 on the opposite side of first aperture 22. Recess 54 is defined by a seat 58, a first wall 60, a second wall 62, and a third wall 64 interconnecting first wall 60 and second wall 62. Third wall 64 includes a pair of detents 66 formed therein. Each detent 66 terminates at a retaining wall 68 (FIG. 3).

To assemble each of the first and second air heaters to intake cover 14, each of the air heaters are first sub-assembled and positioned relative to intake cover 14 as shown in FIG. 1. In the free state, end wall 40 of first holder 26 is spaced apart from end wall 140 of second holder 28 a distance greater than the separation between recess 54 and 56. Accordingly, wave springs 46 and 146 are compressed by forcing first holder 26 toward second holder 28. During compression, first air heater 12 is disposed within first aperture 22.

Figure 4:
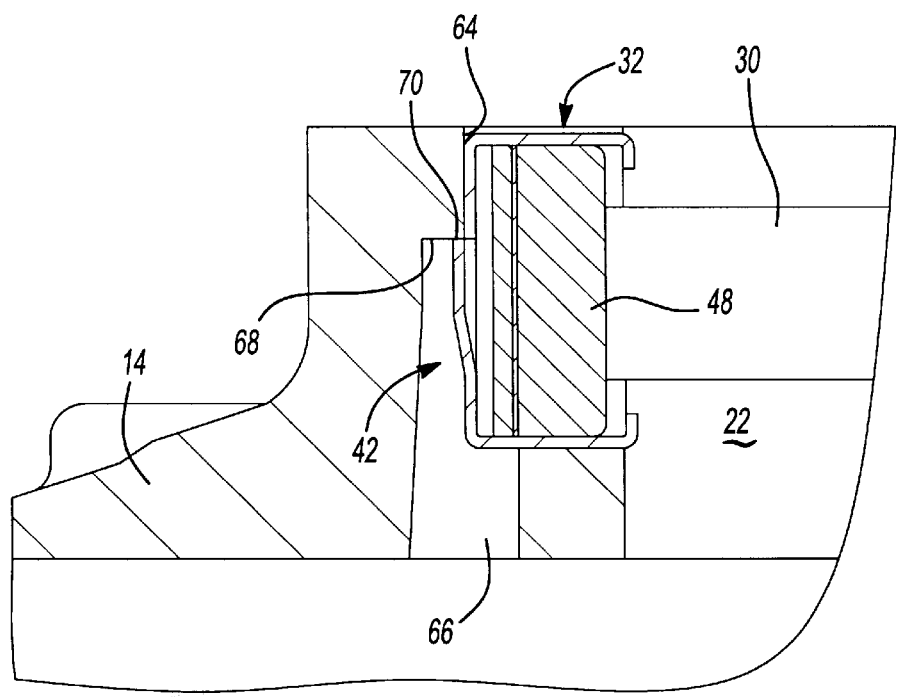
FIG. 4 is an enlarged partial cross-sectional view of the attachment mechanism of the present invention.

As best shown in FIGS. 3 and 4, first air heater 12 is translated within first aperture 22 until side wall 38 contacts seat 58. During the insertion or translation process, tabs 42 and 44 biasedly engage third wall 64. Once a face 70 of tab 42 clears retaining wall 68, tab 42 springs back to its free state position thereby entering detent 66. It should be appreciated that at this time face 70 of tab 42 would resist a force attempting to remove first air heater 12 from first aperture 22 by engaging retaining wall 68. Therefore, once tabs 42 and 44 are snapped within detents 66, first air heater 12 is securely coupled to intake cover 14. Wave springs 46 and 146 provide a biasing force to assure that tabs 42 and 44 remain positioned within detents 66. One skilled in the art will appreciate that attachment mechanism 10 securely retains each of the first and second heaters within the intake cover without the need for a retaining plate or other clamping type device to couple the holders to the intake cover. As such, it is possible to utilize attachment mechanism 10 within intake housings, tubes or manifolds which include substantially open air passageways. In the specific example presented, the air intake tube (not shown) which mates with first mounting flange 18 need not include a center wall section or plate to restrain holders 26, 28, 226 or 228 from axial movement therein.

With reference to FIG. 2, first air heater 12 includes a first terminal 72 and a second terminal 74. Second air heater 16 includes a first terminal 76 and a second terminal 78. Terminals 74, 76 and 78 are electrically insulated from intake cover 14 while terminal 72 is electrically coupled thereto. Terminals 74 and 78 are electrically coupled in series such that an electrical path exists from terminal 72 through heating element 30, terminal 74, a connector bar 80, terminal 78, heating element 230 and terminal 76. It should be appreciated that the electrical path described is merely exemplary and that a parallel or a series/parallel circuit may be constructed without departing from the scope of the present invention. Depending on the type of electrical circuit to be constructed, conductive and non-conductive attachment hardware is appropriately located throughout. Additionally, attachment mechanism 10 may be used to interconnect first air heater 12 with a variety of other air intake devices. It should be apparent from the description of the drawings that attachment mechanism 10 may function with stamped or molded housings, frames or other air intake structures.

Figure 5:
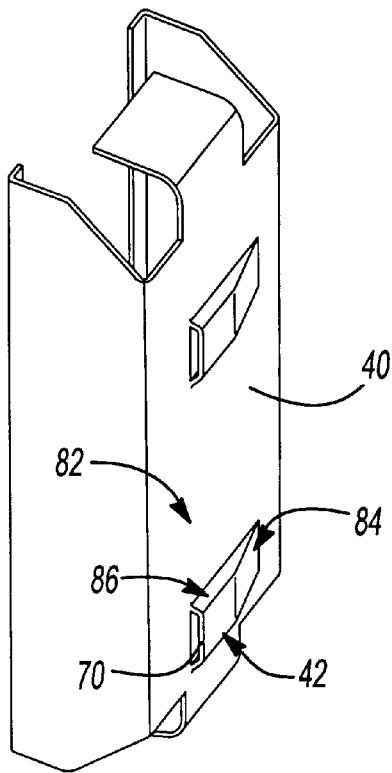
FIG. 5 is a perspective view of a first embodiment tab of the heater retention mechanism.
Figure 6:
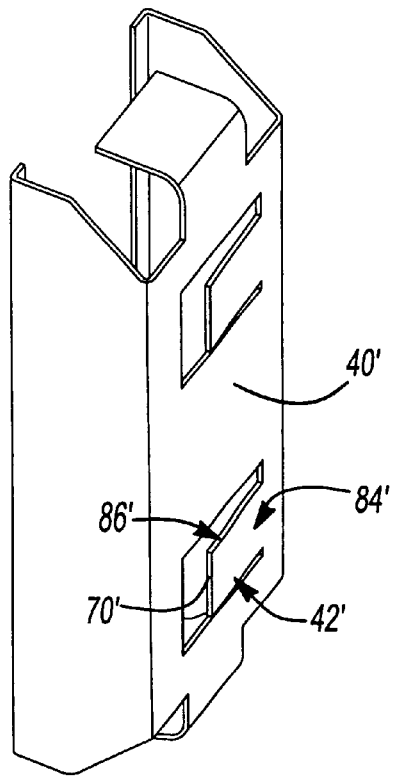
FIG. 6 is a perspective view of a second embodiment tab of the heater retention mechanism constructed in accordance with the teachings of the present invention.
Figure 7:
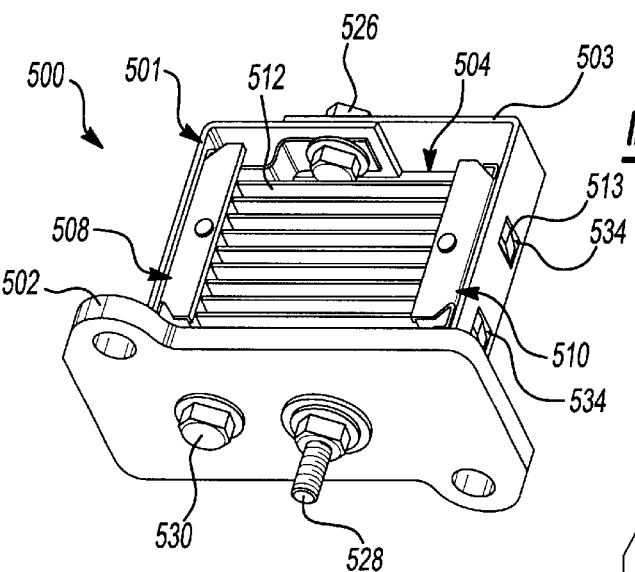
FIG. 7 is a perspective view of an alternate air heater assembly having an air heater retention mechanism constructed in accordance with the teachings of the present invention.
Figure 8:
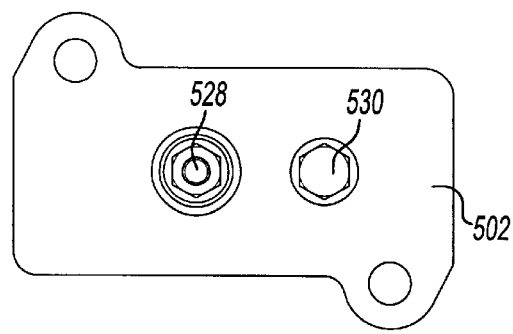
FIG. 8 is a top elevational view of the alternate heater assembly.
Figure 9:
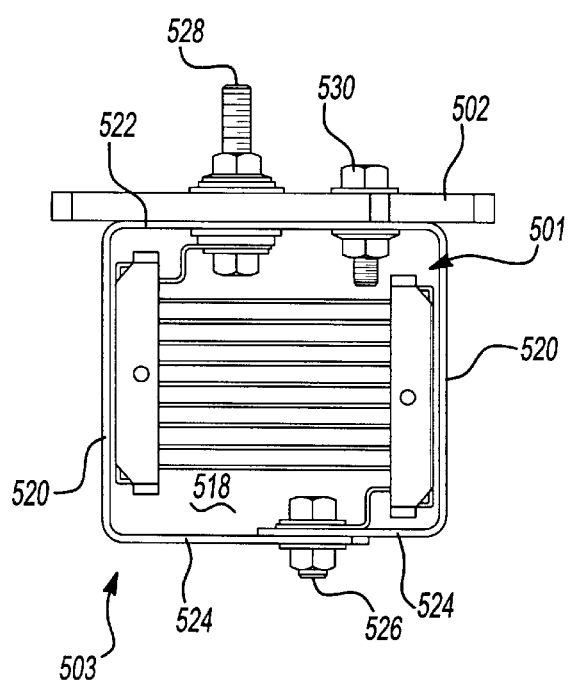
FIG. 9 is a front elevational view of the alternate heater assembly.
Figure 10:
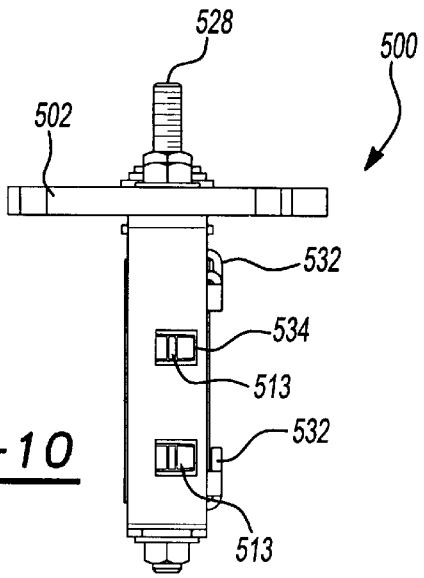
FIG. 10 is a side elevational view of the alternate embodiment heater assembly of the present invention.

FIGS. 5 and 6 depict two embodiments of tab designs contemplated to snap-fit within recess 66. A first embodiment tab 42 is depicted in FIG. 5. Tab 42 includes an integrally formed ramp 82 having a first end 84 and a second end 86. First end 84 is co-planar with end wall 40. Second end 86 of ramp 82 terminates at face 70. It should be appreciated that end wall 40 is completely cut for only a short length adjacent face 70. In this manner, tab 42 remains structurally robust and retains its shape during installation.

FIG. 6 depicts a second embodiment tab 42'. Tab 42' is attached to end wall 40' only at first end 84'. Tab 42' is formed such that second end 86' is offset from end wall 40'. Tab 42' deforms as the holder enters recess 54. Second end 86' springs back once tab 42' enters detent 66. Face 70' is now positioned to engage cover 14 if a removing force is applied to the holder.

With reference to FIGS. 7–10, an alternate air heater assembly is shown at reference numeral 500. Air heater assembly 500 is configured for use in an intake tube (not shown) coupled to an internal combustion engine. Air heater assembly 500 includes a housing assembly to retain a heating element and two heating element holders in a predetermined position relative to the housing assembly. The housing assembly includes apertures for receipt of tabs extending from the holders as earlier described. Air heater assembly 500 is integratable into an air intake system of an internal combustion engine and, more particularly, within a 90° elbow of an air intake tube. This unique configuration of air heater, including the air heater housing, provides enhanced start-ability of the engine not withstanding a restrictive location for the heater. This design provides improved mounting flexibility over traditional bolt-on heater designs.

The second embodiment air heater assembly 500 will now be described in greater detail. Specifically, air heater assembly 500 includes a housing assembly 501 having a mounting flange 502 and a frame 503. Mounting flange 502 is selectively connectable to an air intake tube (not shown) plumbed to the vehicle engine. Mounting flange 502 serves to seal the engine intake passage from the environment surrounding the engine compartment.

Heater assembly 500 also includes an air heater 504 coupled to frame 503. Air heater 504 includes a first holder 508, a second holder 510 and a serpentine heating element 512. It should be appreciated that first holder 508 and second holder 510 are shaped substantially identical to first holder 26 and second holder 28. As such, the holders will not be described in further detail other than to note that holders 508 and 510 each include a pair of tabs 513 shaped similarly to tabs 42 or 42'. It should be appreciated that holders 508 and 510 include wave springs disposed within the formed channels. Also, each holder includes thermal and electric insulators disposed within the channel to capture the wave springs within the holder.

Frame 503 defines a generally rectangularly shaped passage 518 bounded by upright walls 520, top 522, and inwardly extending legs 524. Inwardly extending legs 524 are interconnected by a fastener 526 to complete the rectangular frame. Additional fasteners 528 and 530 couple frame 503 to mounting flange 502. Fastener 528 serves as a terminal electrically coupling a first end of heating element 512 to a point outside of frame 503. Fasteners 526 and 530 ground the opposite end of heating element 512 to frame 503 and mounting flange 502. Each upright wall 520 includes a pair of stops 532 inwardly extending from one of its edges. Stops 532 function to limit the axial movement of air heater 504. Each upright wall 520 also includes a pair of generally rectangularly shaped apertures 534 extending therethrough.

To assemble air heater assembly 500, heating element 512 is positioned between first holder 508 and second holder 510. An assembler forces first holder 508 toward second holder 510 thereby compressing the wave springs positioned within each of the holders. While the compression load is maintained, first holder 508 and second holder 510 are axially disposed within frame 503 until the axial movement is limited by stops 532. During axially insertion, tabs 513 biasedly engage upright walls 520 until they enter rectangularly shaped apertures 534. At this time, tabs 513 spring back to their undeformed shape and enter apertures 534. Based on the direction of insertion in combination with the shape of tabs 513, movement of air heater 504 in a direction opposite to the insertion direction will be resisted by tabs 513.

The foregoing discussion discloses and describes exemplary embodiments of the present invention. One skilled in the art will readily recognize from such discussion and from the accompanying drawings and claims, that various changes, modifications and variations can be made therein without departing from the true spirit and fair scope of the invention.

What is claimed is:

1. An air intake assembly for an internal combustion engine, the air intake assembly comprising:
    an intake member having a passage for communicating air; and
    a heater, wherein the heater includes:
        a first holder;
        a second holder;
        a heating element positioned between said first holder and said second holder;
        biasing means for urging one of said first holder and said second holder away from the other of said first holder and said second holder; and
        a retention mechanism coupling said first holder and said second holder to said intake member within said passage, wherein said retention mechanism includes a first tab integrally coupled to said first holder and a second tab integrally coupled to said second holder, wherein said first tab and said second tab biasedly engage said intake member.

2. The air intake assembly of claim 1 wherein said intake member includes a first detent and wherein said first tab is snap-fit into communication with said first detent.

3. The air intake assembly of claim 2 wherein said intake member includes a second detent and wherein said second tab is snap-fit into communication with said second detent.

4. The air intake assembly of claim 1 wherein said intake member includes a detent and wherein said first tab is biasedly deformed during insertion of said first holder into said passage and wherein said first tab springs back from being deformed when said first tab is positioned within said detent.

5. The air intake assembly of claim 4 wherein said first tab includes a face and wherein said face is placed into engagement with said intake member when a removing force is placed on said first holder.

6. The air intake assembly of claim 1 wherein said intake member includes a seat to limit the distance said first holder may be inserted into said passage.

7. The air intake assembly of claim 6 wherein said intake member includes a detent positioned adjacent said seat and wherein said first tab is positioned within said detent when said first holder is coupled to said intake member.

8. The air intake assembly of claim 1 wherein said first tab and said second tab are oriented to allow insertion of said first holder and said second holder into said passage and also resist removal from said passage.

9. The air intake assembly of claim 1 wherein said first holder includes a housing defining a channel.

10. The air intake assembly of claim 9 wherein said first tab is integral with said housing.

11. The air intake assembly of claim 1 wherein said intake member is a frame coupled to a mounting flange adapted to be positioned within an intake tube.

* * * * *